United States Patent
Merkel et al.

(10) Patent No.: US 8,659,407 B2
(45) Date of Patent: Feb. 25, 2014

(54) SENSOR DEVICE FOR CAPACITIVELY ASCERTAINING DISTANCE

(75) Inventors: Rudolf Merkel, Stutensee (DE); Uwe Zimmermann, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 556 days.

(21) Appl. No.: 12/733,733

(22) PCT Filed: Sep. 11, 2008

(86) PCT No.: PCT/EP2008/062050
§ 371 (c)(1),
(2), (4) Date: Aug. 20, 2010

(87) PCT Pub. No.: WO2009/047073
PCT Pub. Date: Apr. 16, 2009

(65) Prior Publication Data
US 2010/0328056 A1    Dec. 30, 2010

(30) Foreign Application Priority Data
Oct. 5, 2007    (DE) .......................... 10 2007 047 716

(51) Int. Cl.
B60Q 1/00    (2006.01)
G08B 21/00    (2006.01)
G08B 13/00    (2006.01)
G01R 27/26    (2006.01)

(52) U.S. Cl.
USPC ............ 340/435; 340/562; 340/540; 324/662

(58) Field of Classification Search
USPC ....................... 340/342, 425.5, 435, 561, 562;
73/514.32, 700, 718, 724; 701/301;
324/600, 662
See application file for complete search history.

(56) References Cited

U.S. PATENT DOCUMENTS

| | | | | |
|---|---|---|---|---|
| 5,872,507 A * | 2/1999 | Weber et al. | .................. | 340/435 |
| 6,363,619 B1 * | 4/2002 | Schirmer et al. | ................. | 33/288 |
| 6,445,285 B1 * | 9/2002 | Sparling | ....................... | 340/436 |
| 6,446,998 B1 * | 9/2002 | Koenig et al. | ................. | 280/432 |
| 6,486,681 B1 * | 11/2002 | Weber et al. | .................. | 324/662 |
| 6,794,728 B1 * | 9/2004 | Kithil | ............................ | 257/532 |
| 7,603,950 B2 * | 10/2009 | Dukart | .......................... | 102/210 |
| 2003/0163280 A1 * | 8/2003 | Steinlechner et al. | ........ | 702/141 |
| 2006/0055415 A1 * | 3/2006 | Takita | ........................... | 324/658 |
| 2006/0250143 A1 * | 11/2006 | Moon et al. | ................... | 324/674 |

(Continued)

FOREIGN PATENT DOCUMENTS

| | | |
|---|---|---|
| CA | 1 239 785 | 8/1988 |
| EP | 1 640 687 | 3/2006 |

(Continued)

*Primary Examiner* — Hai Phan
*Assistant Examiner* — Royit Yu
(74) *Attorney, Agent, or Firm* — Kenyon & Kenyon LLP

(57) ABSTRACT

A sensor unit, in particular a sensor unit in or on a vehicle, for capacitively ascertaining the distance between the sensor device and an object, having an electrode for forming a capacitive system with the object and an apparatus for creating a signal proportional to the capacitance of the capacitive system. The sensor unit has a reference electrode for forming a capacitive reference system with the object, an additional apparatus for creating a reference signal proportional to the capacitance of the capacitive reference system, and an analyzer device for ascertaining the distance by forming a ratio of the signal and the reference signal, the reference electrodes having an electrode shape, which is different from the electrode shape of the electrode.

10 Claims, 2 Drawing Sheets

(56) References Cited

U.S. PATENT DOCUMENTS

| | | | |
|---|---|---|---|
| 2010/0045454 A1* | 2/2010 | Knight et al. | 340/521 |
| 2010/0079269 A1* | 4/2010 | Hammerschmidt et al. | 340/436 |
| 2010/0079283 A1* | 4/2010 | Hammerschmidt et al. | 340/562 |
| 2010/0289506 A1* | 11/2010 | Moon | 324/681 |

FOREIGN PATENT DOCUMENTS

| | | |
|---|---|---|
| GB | 2 255 641 | 11/1992 |
| GB | 2 366 385 | 3/2002 |
| JP | 57-59101 | 4/1982 |
| JP | 61-182880 | 8/1986 |
| JP | 1-112534 | 5/1989 |
| JP | 4-225102 | 8/1992 |
| JP | 8-62266 | 3/1996 |
| JP | 2000-510408 | 8/2000 |
| JP | 2001-203565 | 7/2001 |
| JP | 2003-232866 | 8/2003 |
| JP | 2005-140700 | 6/2005 |
| JP | 2007-197001 | 8/2007 |

\* cited by examiner

SENSOR DEVICE FOR CAPACITIVELY ASCERTAINING DISTANCE

FIELD OF THE INVENTION

The present invention relates to a sensor device, in particular a sensor device in or on a vehicle, for capacitively ascertaining the distance between the sensor device and an object, having an electrode for forming a capacitive system with the object and an apparatus for producing a signal, which is proportional to the capacitance of the capacitive system.

BACKGROUND INFORMATION

Such a sensor device is known. It is used, for example, in or on vehicles for measuring the distance between the vehicle and objects outside the vehicle, e.g., other vehicles in the surroundings of the vehicle. To do so, an electrode is mounted on the vehicle, forming a capacitive system together with the object (as the counterelectrode). The capacitance of this system is ascertained and used to determine the distance between the sensor device and/or the vehicle and the object. The dielectric constant of the material situated between the electrode and the object—essentially air in this case—is taken into account among other things. With such a system, its capacitance is influenced by the great difference between the dielectric constants of water and air and is thus greatly influenced by weather conditions, e.g., fluctuating atmospheric humidity or temperature fluctuations.

SUMMARY OF THE INVENTION

To eliminate the influence of the dielectric constant, it is provided that the sensor device has a reference electrode to form a capacitive reference system with the object, another apparatus for creating a reference signal, which is proportional to the capacitance of the capacitive reference system and an analyzer device for ascertaining the distance by forming a ratio from the signal and the reference signal, such that the reference electrode has an electrode shape differing from the electrode shape of the electrode. Due to the difference in electrode shapes, the dependence of the capacitance of the reference system on the distance between the reference electrode and the object is different from the dependence of the capacitance of the system on the corresponding distance between the electrode and the object. If the ratio between capacitance $C_1$ of the capacitive system and reference capacitance $C_2$ of the reference capacitive system is formed by the analyzer device, then dielectric constant $\in = \in_0 \in_r$ of the material between the electrode and the object and/or the reference electrode and the object is reduced as a result. Consequently, the ratio is a function of distance, which depends only on the geometric variables and the particular distance between the object and the electrode/reference electrode. The sensor unit is in particular a sensor unit in or on a vehicle; preferably ascertains the distance between the vehicle and an object, and is preferably located outside the vehicle. This object located outside the vehicle is another vehicle, for example.

In an advantageous embodiment of the present invention, one or both electrodes (electrode or reference electrode) is designed as a plate-shaped or essentially plate-shaped electrode and/or the other of the two electrodes is designed as a cylindrical or essentially cylindrical electrode. The electrode shapes of the plate-shaped electrode and of the cylindrical electrode differ substantially. A largely cylindrical electrode may be formed by a suitably shaped conductor, for example. In the case of a plate-shaped electrode/reference electrode, the capacitive system/reference system may be regarded approximately as a plate capacitor. In the case of a cylindrical electrode/reference electrode, the capacitive system/reference system may be considered approximately as a cylindrical capacitor for a distance between the electrode/reference electrode and the object, which is much greater than radius r of the cylindrical electrode. One of the two electrodes is preferably designed as a plate-shaped electrode, and the other of the two electrodes is designed as a cylindrical electrode.

In an advantageous embodiment of the invention, at least one of the apparatuses for creating the signal/reference signal is galvanically separated from the other apparatus for creating the signal/reference signal and from the analyzer device. Due to this galvanic separation, the signal/reference signal may be produced independently of one another in the two apparatuses.

In particular, it is provided that at least one of the apparatuses for creating the signal/reference signal together with the capacitive system/reference system associated with it to form an oscillating circuit. The signal/reference signal is preferably a time constant or a frequency of the oscillating circuit.

At least one of the apparatuses for creating the signal/reference signal advantageously has a shield grid electrode for shielding other potentials. If the sensor unit is mounted in or on a vehicle, then the shield grid electrodes will shield the electrode and/or the reference electrode from the potentials of the vehicle in particular.

In addition, it is provided that the devices for creating the signal/reference signal will advantageously output the signal and/or the reference signal as digital signals to the analyzer device. To do so, the signal/reference signal is preferably converted by an analog-digital converter of the associated apparatus to the digital signal and/or digital reference signal. Next, this digital signal/reference signal is output to the analyzer device. Galvanic separation may be implemented easily and reliably by output as a digital signal/reference signal.

Finally, the analyzer device advantageously has a computation unit for forming the ratio between the signal and the reference signal and for ascertaining the distance from this ratio.

DETAILED DESCRIPTION

Figure 1:
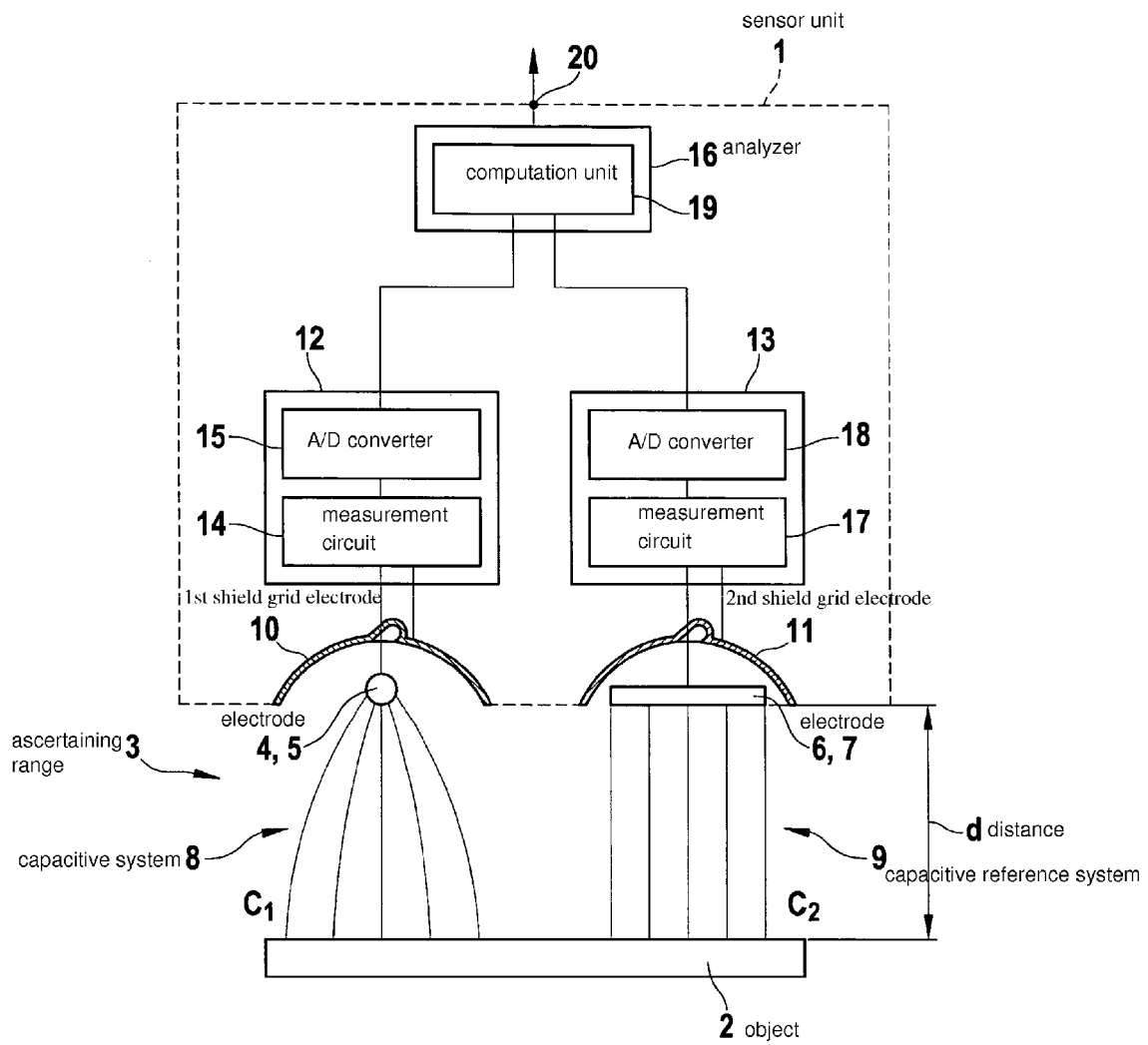
FIG. 1 shows a schematic diagram of a sensor unit.
Figure 2:
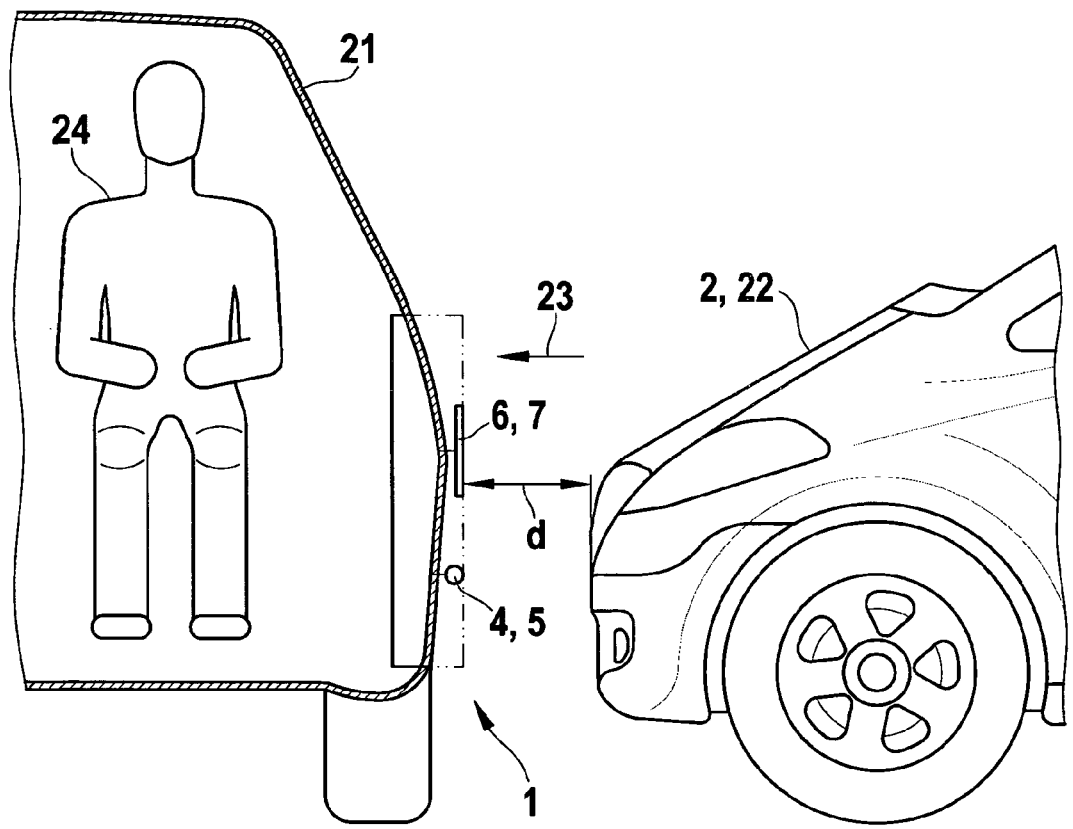
FIG. 2 shows the sensor unit provided on a vehicle having an electrode and a reference electrode and also shows another vehicle.

FIG. 1 shows a schematic diagram of a sensor unit 1 for capacitively ascertaining the distance between it and object 2, which is in an ascertaining range 3. The sensor unit is provided on a vehicle (not shown) and ascertains the distance between it and objects outside of the vehicle, as shown in FIG. 2. The ascertaining range is a range outside of the vehicle. Sensor unit 1 has an electrode 5 designed as an essentially cylindrical electrode 4 and a reference electrode 7 designed as a plate-shaped electrode 6. Electrode 5 together with object 2 forms a capacitive system 8, which is indicated by field lines between electrode 5 and object 2. Reference electrode 7 together with object 2 forms a capacitive reference system 9, which is indicated by corresponding field lines. In order for capacitive system 8 and capacitive reference system 9 each to be limited to ascertaining range 3, electrode 5 is surrounded by a first shield grid electrode 10, and reference electrode 7 is surrounded by a second shield grid electrode 11 in some areas. Shield grid electrodes 10, 11 shield both electrodes 5, 7 from the potentials outside of ascertaining range 3.

Electrode 5 is connected to an apparatus 12 for creating a signal, which is proportional to a capacitance $C_1$ of capacitive system 8. Reference electrode 7 is connected to another apparatus 13 for creating a reference signal, which is proportional to capacitance $C_2$ of capacitive reference system 9. To create signal I, apparatus 12 has a measurement circuit 14 (in particular an oscillating circuit), for creating the actual signal, capacitive system 8 being electrically connected thereto. The actual signal is then output to an analog-digital converter 15, which creates a corresponding digital signal I from the actual signal and outputs it to an analyzer device 16. The additional apparatus has a measurement circuit 17, to which capacitive reference system 9 is connected electrically. An actual reference signal $I_R$, which is proportional to capacitance $C_2$ of capacitive reference system 9, is created by measurement circuit 17. This actual reference signal $I_R$ is output to an analog-digital converter 18 of additional apparatus 13. Analog-digital converter 18 creates a digital reference signal $I_R$ from this actual reference signal $I_R$ and outputs it to analyzer device 16. Analyzer device 16 has a computation unit 19 for forming a ratio from the signal and the reference signal and for ascertaining distance d from this ratio. The average distance is then output via an output 20.

This provides the following function of sensor unit 1 for capacitively ascertaining distance d between it and an object 2. The different electrode shapes of electrode 5 and reference electrode 7 yield different functions linking capacitances $C_1$, $C_2$ of capacitive system 8 and capacitive reference system 9 to distance d. Capacitance $C_1$ of the capacitive system (single conductor arrangement) having a largely cylindrical electrode 4 may be approximated by the capacitance of a cylindrical capacitor, yielding capacitance $C_1$ of the arrangement as follows:

$$C_1 = 2 \cdot \pi \cdot \frac{\varepsilon_0 \varepsilon_r \cdot A}{\ln(d/2r)} \quad (1)$$

Capacitances $C_2$ of capacitive system 9 may be assumed to be approximately the capacitance of a plate capacitor, which is obtained as follows:

$$C_2 = \frac{\varepsilon_0 \varepsilon_r \cdot A}{d} \quad (2)]$$

where I is the length of electrode 5, r is the radius of electrode 5, and d is the distance from the surface of object 2. In the case of a plate capacitor, A is the effective electrode surface area, and d is the plate distance. In addition, electric field constants $\varepsilon_0$ and $\varepsilon_r$ are also entered into equations 1 and 2. Dielectric constant $\varepsilon_r$ is a characteristic constant of the material between electrode/reference electrode 5, 7 and object 2. If sensor unit 1 is used to measure the distance between sensor unit 1 and an object 2 outside of a vehicle, then the capacitance of arrangements 8, 9 is influenced greatly by weather conditions, such as fluctuating atmospheric humidity and temperature fluctuations because of the much higher dielectric constant of water in comparison with the dielectric constant of air. These weather dependencies may be eliminated through the measurement with electrode 5 and reference electrode 7, which are designed as electrodes 5, 7 of different electrode shapes.

Capacitances $C_1$, $C_2$ are measured by measuring circuits 14, 17, for example, by measuring a rise time as a time constant. The measurement of capacitances $C_1$, $C_2$ and/or the creation of signals I, $I_R$, which are proportional to capacitances $C_1$, $C_2$, must be performed independently of one another. This is accomplished by galvanic separation with the aid of analog-digital converters 15, 18, whose output signals are independent of the potential of electrode 5 and/or reference electrode 7. The output signals of analog-digital converters 15, 18 (digital signal and digital reference signal) are sent to analyzer device 16, which forms a ratio from the signal and the reference signal ($C_1$:$C_2$). Due to this formation of a quotient, weather-dependent dielectric constant $\varepsilon_r$ is canceled out, yielding the following distance function: q(d), which depends only on geometric variables and distance d of electrodes 5, 7 from the surface of the object as the counterelectrode:

$$\frac{C_1}{C_2} = 2 \cdot \pi \cdot \frac{1}{A} \cdot \frac{d}{\ln(d/2r)} \quad (3)$$

FIG. 2 shows an exemplary embodiment for mounting sensor unit 1 with electrode 5 and reference electrode 7 on a vehicle 21. The corresponding counterelectrode of capacitive system 8 and capacitive reference system 9 is formed by the object, which is embodied as an additional vehicle 22. The shield grid electrodes for shielding electrodes 5, 7 from the mass of vehicle 21 are not shown. By ascertaining distance d continuously or by ascertaining distance d at intervals of time, the relative speed of object 2 in comparison with the sensor unit may be ascertained. The system of sensor unit 1 of FIG. 2 is used in a side area of vehicle 21 and may be used to detect a collision with an additional vehicle 22 moving toward vehicle 21 (arrow 23) significantly before the actual impact and to take measures to protect occupants 24 of vehicle 21, for example.

What is claimed is:

1. A sensor unit for capacitively ascertaining a distance between the sensor unit and an object, comprising:
   an electrode for forming a capacitive system with the object;
   an apparatus for providing a signal, which is proportional to a capacitance of the capacitive system;
   a reference electrode for forming a capacitive reference system with the object;
   another apparatus for creating a reference signal, which is proportional to a capacitance of the capacitive reference system; and
   an analyzer device for ascertaining the distance by forming a ratio from the signal and the reference signal, the reference electrode having an electrode shape, which differs from an electrode shape of the electrode.

2. The sensor unit according to claim 1, wherein the sensor unit is in or on a vehicle.

3. The sensor unit according to claim 2, wherein the object is an object situated outside of the vehicle.

4. The sensor unit according to claim 1, wherein at least one of the electrode and the reference electrode is substantially plate-shaped.

5. The sensor unit according to claim 1, wherein at least one of the electrode and the reference electrode is substantially cylindrical.

6. The sensor unit according to claim 1, wherein at least one of the apparatuses is galvanically separated from the other apparatus and from the analyzer device.

7. The sensor unit according to claim 1, wherein at least one of the apparatuses forms an oscillating circuit with the capacitive system/reference system associated with it.

8. The sensor unit according to claim 1, wherein at least one of the apparatuses has a shield grid electrode for shielding against other potentials.

9. The sensor unit according to claim 1, wherein the apparatuses output at least one of the signal and the reference signal as digital signals to the analyzer device.

10. The sensor unit according to claim 1, wherein the analyzer device has a computation unit for forming the ratio and for ascertaining the distance.

\* \* \* \* \*

UNITED STATES PATENT AND TRADEMARK OFFICE
CERTIFICATE OF CORRECTION

PATENT NO.       : 8,659,407 B2
APPLICATION NO.  : 12/733733
DATED            : February 25, 2014
INVENTOR(S)      : Merkel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Twenty-ninth Day of September, 2015

Michelle K. Lee
*Director of the United States Patent and Trademark Office*